Oct. 18, 1966  C. T. HUTCHENS  3,279,815
SUSPENSION ASSEMBLY FOR VEHICLES AND PROCESS
Filed June 15, 1965  8 Sheets-Sheet 1

INVENTOR
CHARLES T. HUTCHENS
BY Cushman, Darby & Cushman
ATTORNEYS

Oct. 18, 1966 C. T. HUTCHENS 3,279,815
SUSPENSION ASSEMBLY FOR VEHICLES AND PROCESS
Filed June 15, 1965 8 Sheets-Sheet 2

INVENTOR
CHARLES T. HUTCHENS
BY Cushman, Darby & Cushman
ATTORNEYS

Oct. 18, 1966

C. T. HUTCHENS 3,279,815

SUSPENSION ASSEMBLY FOR VEHICLES AND PROCESS

Filed June 15, 1965

INVENTOR

CHARLES T. HUTCHENS

BY Cushman, Darby & Cushman
ATTORNEYS

Fig. 12.

Oct. 18, 1966   C. T. HUTCHENS   3,279,815
SUSPENSION ASSEMBLY FOR VEHICLES AND PROCESS
Filed June 15, 1965   8 Sheets-Sheet 6

INVENTOR
CHARLES T HUTCHENS

BY Cushman, Darby & Cushman
ATTORNEYS

Oct. 18, 1966  C. T. HUTCHENS  3,279,815
SUSPENSION ASSEMBLY FOR VEHICLES AND PROCESS
Filed June 15, 1965  8 Sheets-Sheet 7

INVENTOR
CHARLES .T. HUTCHENS
BY
ATTORNEYS

United States Patent Office 3,279,815
Patented Oct. 18, 1966

3,279,815
SUSPENSION ASSEMBLY FOR VEHICLES
AND PROCESS
Charles T. Hutchens, P.O. Box 1427 SSS, Springfield, Mo.
Filed June 15, 1965, Ser. No. 464,166
23 Claims. (Cl. 280—104.5)

This application is a continuation-in-part of my copending application, Serial No. 179,328, filed March 13, 1962.

The invention relates to improvements in suspension assemblies for vehicles and, more especially, to a new concept in single and multiple axle suspension. The invention is particularly concerned with the production of a suspension unit having a minimum number of parts and requiring a minimum number of fabricating steps. The invention also has reference to a new and improved rigid torque arm construction which includes novel means for mounting torque arms to distribute stress loads in a notably superior manner.

In the construction of tandem suspension units, including sliders, bogies and the like, for trailers, trucks, etc., it is known that there must be a bogie frame as long or slightly longer than the spring or springs under each vehicle to support the suspension unit, axles and so forth. The bogie frame and related parts are welded, bolted, or otherwise fastened to the bottom of the vehicle bed in the usual method of manufacture. Each bogie frame usually consists of two longitudinal beams or rails provided with cross members to keep the rails in place and provide suitable bracing. The spring hangers, trunnion mounting bracket, torque arm mountings and the like attachments are then fastened underneath the bogie frame, after which the springs, axle mounting housings, torque arms, axles and wheels may be joined thereto.

It is known that these parts may be joined to the vehicle body in any feasible sequence, and sometimes, separate groups of parts are fabricated into a sub-assembly, which is then joined to the whole. Whatever presently known fabricating method is followed however, the result may well be subject to misalignment and problems of imbalance, unless great care is observed. This is sometimes correctible with the use of adjustable torque arms, but the result has not been completely satisfactory. Further, some presently known tandem suspension units are objectionably high in cost and yet do not offer satisfactory alignment.

For example, in one known method of manufacture, the rails, cross members, spring hangers, axles and wheels, etc., are assembled together to form a "slider" which is a separable bogie unit, resembling a dolly, that is adapted to be secured in a variety of positions along a vehicle body. The unit may be adjusted in location with respect to the vehicle, to suit state laws, and may even be removed from one body to another, as each body becomes worn out. However, this type of unit is objectionably expensive because of high initial cost in fabricating a well aligned unit from a great variety of separate parts. The number of parts heighten the possibility of error, and the requisite cost to be substantially free of error is almost prohibitive.

In a more preferred construction, the spring hangers and torque arm hangers are separately mounted, although they are not ordinarily fastened directly to the frame of the vehicle. Instead, the spring hangers, including the hanger for springs, torque arms, and equalizer in a tandem unit, are individually attached to a sub-frame composed of rails and cross members, that is built under that part of the vehicle body adapted to receive the spring hangers, etc. Mounting of these parts is followed by attachment of the suspension units including springs, axles and wheels. If the spring hangers are not very accurately placed and fastened, malalignment of the springs, axles and wheels will result. This occurs very frequently, sometimes to the extent that it cannot be corrected by adjustable torque arms. Also, when the spring hangers are being individually attached (in addition to the danger of placing one too far back or too far forward, which frequently happens), if the spring hanger is not welded or bolted on in exact parallel alignment with the frame, this will cause considerable wear and frequently cause the axles and wheels to be out of alignment.

Hence, much of the presently known tandem unit is put together from many parts, creating possibilities of weakness and malalignment that increase from part to part. There are also possibilities of misalignment that can cause trouble in actual operation and these difficulties cannot be simply overcome with the use of an adjustable torque arm. Other objections to suspension systems of present practice will become apparent in the body of this specification when reference is had to the advantages offered by the present invention.

This invention also relates to improvements in torque arms. The ordinary torque arm is joined at one end to the spring hanger where it works on a pivot or hinge pin, and the other end is joined to the axle or spring seat. In this way, the end fixed to the spring hanger will allow the other end to work up and down. In effect, the axle is held on a pivot.

Torque arms operatively mounted to the axles and tandem structure of a vehicle are necessarily subjected to fluctuating adverse stresses when the vehicle is moved over uneven ground so that there are often times when an unbalanced weight is carried by the two axles of the tandem unit, as when a trailer is moving over rough roads.

With the ordinary and prior art torque arm and ordinary spring seating arrangements, the axle turns when the brakes are applied until the rear end of the spring, by pushing up, generally stops this turning. The turning and rolling of the axle takes the weight off the front end of the front spring and throws it rearwardly and causes the front spring end to leave its associated bearing surface. When the brakes are applied, this type of imbalance results in undesirable spring chatter and consequent wheel hopping or "brake hopping" and the like. These objections are accentuated if the spring hangers and axles are not properly aligned to begin with.

In my prior Patent No. 2,900,197, there is disclosed a tandem spring suspension system wherein the torque arms are fixed to the axles. This construction has met with limited success in equalizing undesirable stresses that are transferred to the torque arms, but there is still a need in the art for improvements in tandem axle suspension units that will obviate the objections of high cost, malalignment, brake hopping and the like.

It is therefore a principal object of this invention to provide a vehicle suspension that will obviate the foregoing defects.

It is another principal object of this invention to provide a vehicle suspension that is fabricated with a minimum number of operations in order to reduce cost, increase productivity, and decrease the likelihood of misalignment and the like.

It is a further principal object of this invention to provide a novel fabrication process for the manufacture of a vehicle suspension according to the invention, permitting great savings in labor, and establishing a basis for hitherto unexpected precision in tandem suspension construction at remarkably low cost.

Ancillary to the preceding objects, it is another object of this invention to provide a vehicle suspension which includes a novel torque arm construction and mounting wherein the torque arms are operatively mounted in a new and improved manner to more evenly distribute the stresses imparted thereto from the axles.

It is another ancillary object of this invention to provide a tandem trailer construction wherein the axles are operatively carried by an axle housing on the respective leaf spring assemblies, there being provided torque arms having a polygonal or multiplanar recess resiliently engaged about each axle housing assembly so that the load imparted thereto is distributed in a novel and notably superior manner.

It is still another ancillary object of this invention to provide an axle housing assembly which carries a sleeve bearing of resilient material disposed about the axis of the wheel.

It is a further ancillary object of this invention to provide a torque arm wherein a novel adjustable connection is provided to regulate the length thereof.

It is still a further ancillary object of this invention to obviate the provision of a pivot or hinge pin connecting the rear end of the torque arm to the axle housing by providing a rigid connection therebetween including a box-like connection lined with a resilient material such as a rubber bushing or bearing sleeve, which prevents pivoting of the torque arm.

Other and further objects of this invention, together with an appreciation for the advantages thereof, will become increasingly apparent as this description proceeds.

Broadly stated, the objects of this invention are accomplished, advantages are realized, and prior art defects are overcome by providing a suspension assembly principally comprising a pair of side rails that are integrally connected by cross members and secured by various reinforcing members. According to the invention, each side rail includes at least two and preferably three integral hanger sections depending therefrom, with two of the hanger sections being disposed substantially at each end of the side rail, and the third hanger section being substantially intermediate the two hanger sections. Each hanger section preferably tapers from top to bottom. A plurality of hanger side plates are also provided that are substantially identical to each of the hanger sections. Each hanger side plate is disposed inwardly of a corresponding hanger section and is integrally connected to the suspension assembly, thereby defining a spring hanger bracket with the corresponding hanger section.

The concept of "unitized tandem" is realized primarily in that the side rails and integral hanger sections are stamped out in one piece, or cast in one piece. The hanger side plates, cross members, and reinforcing members are preferably formed in the same way. Because of the one piece side rail construction, there is no possibility of misalignment and the entire unit is much easier to install. The manufacturers' cost is much less because there are fewer parts to weld or bolt together. The vehicle suspension of the invention will also save a great deal of labor in the manufacture of the completed trailer because of fewer parts, and because of predetermined, accurate alignment. It is also the feature of integrally joining all parts into one part, preferably by welding, that characterizes this inventive development as a "unitized tandem," or a "unitized suspension" assembly or system.

With the construction according to this invention, the prior art defects are principally overcome because the spring hangers are built into and form an integral part of the bogie frame so that the whole vehicle suspension, including frame, can be fastened to the bottom of a truck or trailer bed in one operation.

This vehicle suspension will have the advantage of being much less expensive to the manufacturer than the current practice of either manufacturing a suspension unit from separately purchased parts, or of purchasing the frames separately, installing them, and then having the suspension unit, including spring hangers and so forth, fastened to the frame. The cost to the manufacturer at present to buy the frame and buy the suspension unit separately, is well in excess of three hundred dollars. With the present invention, on the other hand, fabricators will be able to market a complete suspension unit, with springs, axles and so forth, including all parts that go into the usual suspension assembly, for a price in the neighborhood of two hundred dollars. This is a remarkable saving in a highly competitive field.

Other advantages are also realized with the suspension unit of this invention. For example, the height of the unit from the road or the height above the road at which it is desired to support the truck or trailer bed can be easily varied due to the unique manner of fabricating the side rails. As an illustration, the height of the unit illustrated herein can be varied from a fraction of an inch to as much as a plus or minus eight or more inches. Normally, vertical height variations of a plus or minus three or four inches is considered entirely adequate. This ability to vary "off the road height" is a matter of particular importance when tandems are being installed to replace either single axle units or worn out tandem units on existing equipment. Very frequently in the installation of replacement units, a support height that is different from the height of the stock replacement unit is desired. It has been the practice that a fabricating shop is required to cut off, or more frequently, "fill in" between the ordinary sub-frame and the actual truck or trailer frame. This, of course, can be done by adding an extra piece of steel channel, girder, plate or casting, but this type of "makeshift" alteration increases the likelihood of misalignment, etc. Also, such changes alter the design characteristics of the replacement unit, and may give rise to premature failure, vibration, sway, and the like. With the construction of the present invention on the other hand, variation in height is an easy matter that will permit manufacture in different heights to suit different customers' desires.

However, the chief difference of the suspension unit according to this invention, from prior known tandem suspensions, is that in the device according to the invention, the spring hangers and other attachments to the two side rails of the sub-frame are stamped out and formed as an integral part of such sub-frame. There is great advantage to doing this, particularly when compared to a construction that requires bolting or even welding on of the spring hangers as well as other attachments because each such spring hanger or attachment has to be separately and carefully located in the exact position where it is to be bolted on or welded on. A very slight deviation can cause excessive wear or even cause the springs to come out of the spring hangers. On the other hand, where the whole unit is stamped out and made as one piece, as is done according to the present invention, these major errors in alignment (and even minor errors) in the location of the spring hangers on the suspension unit, are completely avoided because all parts are stamped, formed and bent in identical dies. In this manner, one may eliminate wear and other troublesome objections that occur with the usual way of putting a suspension unit together and fastening it in place because all essential alignment is accurately predetermined by the dies. Still other advantages of this suspension unit will become apparent at the end of this specification.

The rigid torque arm according to this invention is a different matter and while it is proposed to market the suspension unit of this invention with such rigid torque arm, in fact, the rigid torque arm can be used with almost any presently known type of tandem to accomplish the purpose intended. Similarly, the suspension unit just described can be used with almost any presently known type of torque arm. With this rigid torque arm, the torque or pressure of the brakes is largely transferred to the toque arm. This leaves the spring more level so that the front ends thereof will not tend to move down and away from the spring mounting pad.

This torque arm is provided with a resilient sleeve bearing that is of circular configuration at the ends thereof while being of rectangular, polygonal, or multiplanar configuration in the center portion, which, in turn, engages a rearwardly extending planar recess in the torque arm. The load is transferred from the axle to the torque arm through the resilient bearing sleeve via an axle saddle block joined to the axle and having a corresponding rectangular, etc., exterior configuration, which engages the center portion of the bearing sleeve. A notably superior distribution of adverse stresses is provided because of this resilient connection between the torque arms and the tandem axle housings, since the torque arms are in planar engagement with the exterior surface of the resilient sleeve.

The main feature of this rigid torque arm, while it is fastened to the hanger in a manner that will permit it to pivot at such point, is that it forms a box at the point where the axles are fastened. This box is provided with a rubber bushing that does not permit pivoting of the torque arm itself at such point, but holds the axle and keeps the axle from turning except for a very limited movement that is taken up by the rubber bushing.

In more detail, the rubber bushing is made of two parts, an upper half and lower half, but when clamped in position, it becomes in effect one bushing for the axle. The wide part of the bushing is square on the outside, and it is around this square that the rigid torque arm fits. The inside of this square part of the rubber bushing is also square and has a steel or other appropriate metal lining. A round or circular part extends from either side of the square part of the bushing. This part is round on both the outside and the inside. The round inner hole has a circumference equal to the size of the axle to permit the axle to pass through the bushing. The steel or other appropriate metal liner of the square part of the bushing is preferably welded or otherwise permanently affixed to the axle. This prevents any large turn of the axle under torque stress such as when the brakes are applied in fast starts or things of that kind. The axle can only turn to the extent the rubber gives inside of the rigid torque arm.

The spring seat of the spring rests upon the round part of the bushing that extends out from either side of the square part enclosed by the rigid torque arm. This permits a limited amount of spring rotation around the axle that is limited by the amount of the resiliency in that part of the rubber bushing, to accomplish the balancing feature between the two ends of the spring. The square center section of the sleeve stops axle rotation in the end section of the torque arm. As will be appreciated, the springs must turn on the axle to allow weight equalization between the two ends of the spring, and, the tendency for the axle to turn with the wheels when the brakes are applied is effectively counterbalanced by the center square section torque arm. Hence, this connection allows a limited yielding by virtue of the resilient joint, providing a limited degree of turning of the axle within the torque arm, but nevertheless transfers this stress to the torque arm instead of to the spring assemblies.

Other and further advantages of the suspension unit and rigid torque arm of this invention will become increasingly apparent as this description proceeds, but the understanding of the invention will now be facilitated by reference to the drawings, wherein:

FIGURE 9 is an inside elevation view of a typical blanked lefthand rear inside hanger side plate (cf. FIGURE 1) prior to any forming operations, and represents the first stage of production thereof;

Figure 1:
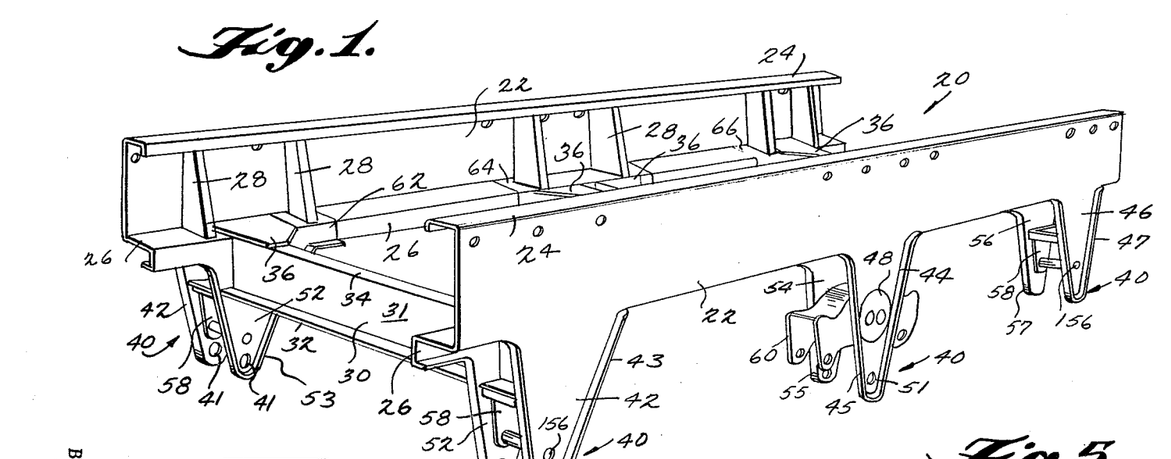
FIGURE 1 is a perspective view of a completed suspension unit according to the invention.

Turning now to FIGURE 1 of the drawings, the suspension unit or single unit sub-frame according to the invention is designated generally by the reference numeral 20 and is composed of two mirror image side rails 22. The side rails 22 are preferably provided with upper rigidifying channel sections 24 and lower rigidifying channel sections 26 reinforced with the flanges 28. FIGURES 5 to 8, showing the sequence of producing the side rails, also serve to illustrate the channel sections 24 and 26, as do FIGURES 2, 3 and 4.

Each upper edge rigidifying channel 24 is preferably continuous for the length of the side rail and is integrally formed therewith from a flat piece of side rail stock plate so as to be turned inwardly of the side rail with respect to the completed sub-frame. The channel 24 has the general shape of an inverted L with respect to the sub-frame, in that the side rail forms the body of the L, and the channel has a base that is approximately perpendicular to the plane of the side rail, and a lip depending from such base that is approximately parallel to the plane of the side rail. The lower edge rigidifying channel 26 is also continuous in the sense that it is formed in part from the flat stock of the side rail and in part from the flat stock of the hanger side plate described hereinafter. The channel 26 is preferably disposed inwardly of the side rail with respect to the sub-frame. The channel 26 has the general shape of an L that is rotated about 90° from the vertical such that the body and lip of the L are approximately perpendicular with respect to the plane of the side rail, and such that the base of the L is approximately parallel to the plane of the side rail. Preferably, the channels 24 and 26 are in parallel alignment with each other, such that in cross section they will generally have the shape of a figure 5 with the substantially vertical straight leg of the figure representing the plane of the side rail. Other channel section shapes and locations can also be employed, but those illustrated in the drawing are to be preferred.

As shown in the drawings, there are preferably six reinforcing flanges 28 integrally attached to each side rail on the inside thereof with respect to the sub-frame, although more or fewer such flanges may be employed. Preferably, the reinforcing flanges 28 are disposed in approximately parallel alignment between the channels 24 and 26.

The illustrated flanges 28 resemble a triangular shape in plan view with the hypotenuse describing an acute angle between the channel 26 and the inside face of the side rail 22. It is preferred that each reinforcing flange 28 has a stabilizing element or lining flange 29 along the hypotenuse side thereof.

The two side rails 22 are connected together by any desired number of reinforcing cross beams or cross members 30. Four such cross members 30 are preferred. The cross members 30 on each end are preferably defined by a central plate 31 having a lower turned out flange 32 and an upper turn in flange 34. The central cross members are preferably U-shaped channel sections such that the flanges 32 and 34 face in the same direction. The members 30 are preferably produced by blanking a flat plate followed by braking in the desired direction to form the flanges 32 and 34. The cross members 30 are integrally joined to the side rails 22 by welding, preferably to the inside face of the hanger side plates described hereinafter and this connection is preferably reinforced by the flange plates 36 welded to the top flange 34 and to the channel member 26 across the point of connection.

The illustrated end cross beams 30 are approximately Z-shaped in cross section. They are formed by blanking a flat piece of stock plate followed by braking the upper and lower edges thereof in opposite directions along parallel lines. It is perferred that the central cross beams 30 are approximately U-shaped in cross section. They are formed by blanking flat stock, followed by braking the upper and lower edges thereof in the same direction along parallel lines. The reinforcing web flange member 36 is preferably a flat plate that may be approximately triangular in shape, or pentagonal, and is integrally secured along a side edge thereof to the respective cross member 30, and along a base edge thereof to the upper face of the reinforcing channel 26.

According to this invention, it is an important feature that each of the side rails 22 is provided with integral depending hanger sections 42, 44 and 46. Each hanger section is provided with a corresponding hanger side plate 52, 54 and 56 defining therebetween a spring hanger 40. Spring mounting pads 58 may be mounted within the end spring hangers 40, and the trunnion mounting or equalizer member 60 may be received in the spring hangers 40 internally of the hanger sections and side plates 44–54. Preferably, each hanger section 42, 44 and 46 has a lining flange 43, 45 and 47 along the edge thereof defining in cross section a smooth curve that leads from the plane of the hanger section and sweeps into and terminates in a straight line that is approximately perpendicular to the plane of the hanger section. The angle of inclination of the lining flange with respect to the plane of the hanger section, may be an angle approaching 90°, such as about 30° or more, and may be greater than 90°, although about 90° is preferred for best results. The several lining flanges terminate approximately at the intersection of the corresponding hanger section with the side rail 22, and it is preferred that each lining flange is turned outward with respect to the sub-frame.

As illustrated, each of the hanger sections taper from top to bottom, and this configuration is presently preferred. In a more limited sense, the end hanger sections approximately resemble a right triangle, and the central hanger section resembles an isosceles triangle, and all hanger sections are rounded at the bottom. It is also preferred that each hanger section merge into the upper side rail plate 22 by means of smooth curves at the area of intersection. Also, the plane of the central hanger section 44 is desirably provided with a raised area or detent 48 that faces out with respect to the sub-frame and defines an area for receiving the trunnion mounting equalizer bracket 60. Suitable bolt openings 49 are provided to facilitate mounting of the bracket 60 between the central hanger section 44 and the corresponding hanger side plate 54. The central hanger section 44 on each side rail, and the end hanger section 42 on each side rail, as well as the corresponding hanger side plates 54 and 52, are each provided with an opening 51 and 41 toward the respective bottoms thereof. Each of these openings is preferably defined by an area that is raised or turned in with respect to the spring hanger space 40 between each hanger section and corresponding side plate. These openings and raised areas are adapted to receive a connecting pin or bolt passing through one end of a torque arm described hereinafter.

Figures 2, 3:
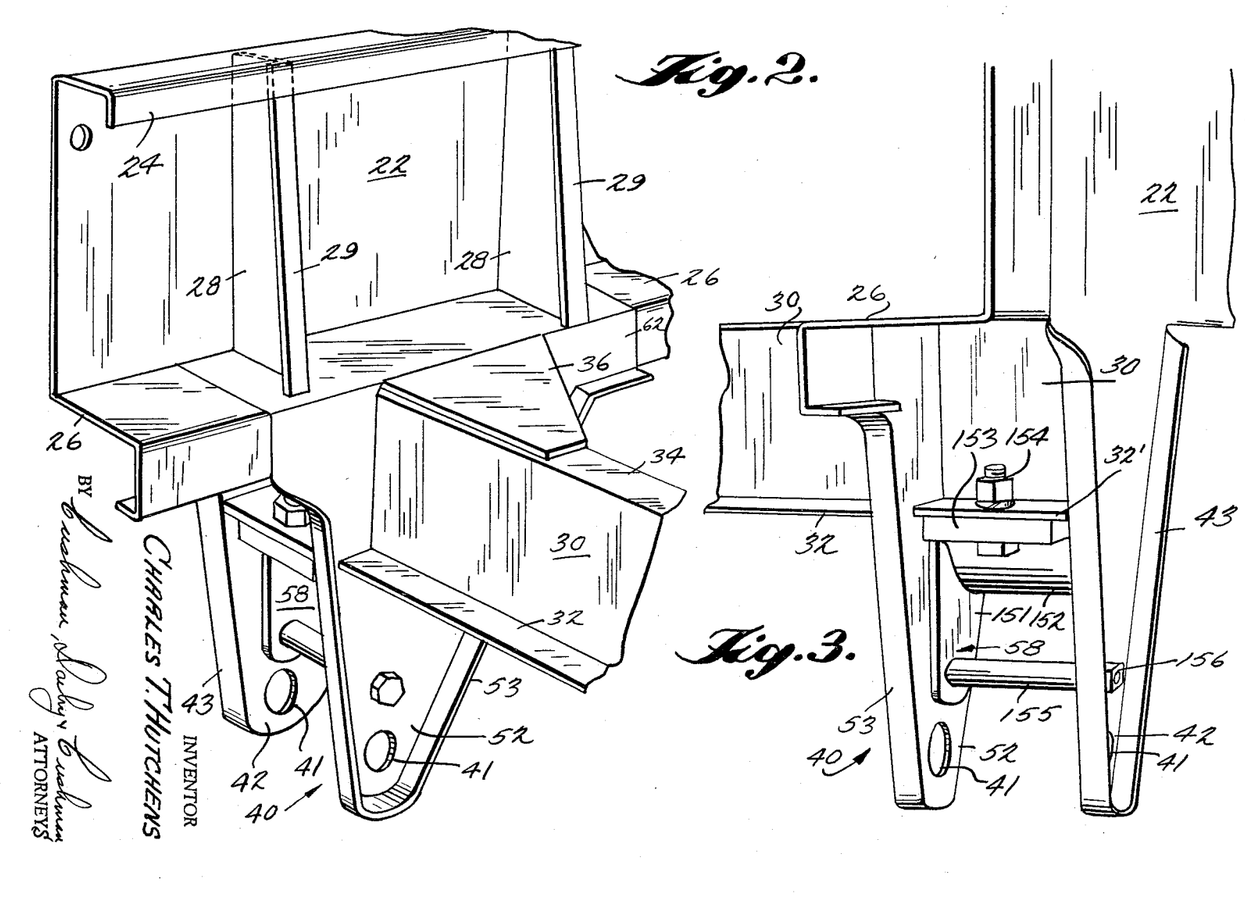
FIGURE 2 is a broken out perspective view, greatly enlarged, of the lefthand rear spring hanger assembly of the suspension unit shown in FIGURE 1.
FIGURE 3 is a broken out perspective view, also greatly enlarged, of the righthand rear spring hanger assembly of the suspension unit shown in FIGURE 1.

Each end spring hanger 40, defined by hanger sections 42 and 46 and corresponding side plates 52 and 56, also receives the integrally fastened spring mounting pad 58 such that the spring mounting pad 58 tends to rigidify the spring hangers with respect to the sub-frame. As best shown in FIGURE 3, each spring mounting pad has a pair of side flanges connected at the upper end by a bearing surface 152 that terminates in the base flanges 153. Suitable holes in the base flanges 153 receive a bolt 154 that passes through a corresponding hole in the flange 32' defining an extension of the cross member 30 between the hanger section 42 and the hanger side plate 52. Tubular bushing 155 at the lower end of the pad 58 receives the bolt 156 which passes through suitable openings 59 in each of the affected hanger sections and side plates.

As to location, it is preferred that with a plurality of hanger sections, a hanger section should be located approximately at each end of each side rail, and each end hanger section will generally be the mirror image of the hanger section at the opposite end of each side rail. The central hanger section 44 is then located approximately intermediate the end hanger sections. When the hanger sections 42 and 46 are located at each end of the sub-frame, they will define the approximate length of each side rail. However, it will sometimes be desired that at least one end of each side rail should extend beyond the corresponding end hanger section, and this modification has been illustrated in the drawings by the dotted lines and extension areas 22'. It is generally intended that the lengths of these suspension units will just extend from the front of the front hanger to the rear of the rear hanger. With the added sections 22', the rails 22 can extend several inches (e.g., four inches) forward and backward from the respective front and rear hangers. The longer rails can be stamped out by proper dies or they can be supplied by welding on these additional parts. Both long and short rails, of course, can be either permanently fastened to the bottom of a vehicle body or attached as a "slider," that is, so attached that they can be positioned with the wheels either forward or backward of any given point.

Figure 4:
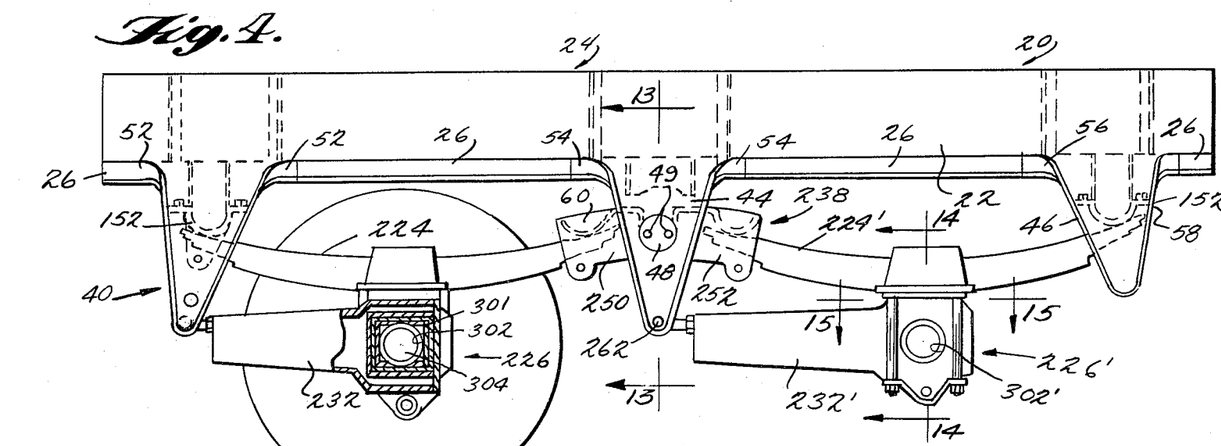
FIGURE 4 is a side elevation view of the suspension unit of the invention as it would appear in assembled configuration with suitable springs and the like and this figure also illustrates the novel axle housing mounting and rigid torque arm embodiments of this invention, as they would appear in assembled position on the suspension unit.

Referring now to FIGURE 4, there is shown a tandem assembly 20 for attachment to the underside of a vehicle such as a trailer or the like (not shown). The assembly 20 is of symmetrical construction so that only one side is shown. In FIGURE 4, the unit appears in side elevation substantially as it would appear when mounted on a suitable trailer or other tandem axle vehicle. The unit 20 includes the upper side rail frame 22 carrying forward and rearward leaf spring assemblies 224 and 224', respectively. As shown, the spring 224 is mounted between the hanger sections 42 and 44. The left end of the spring is received in the spring mounting pad 58 mounted between the hanger section 42 and side plate 52 and the right end of the spring is mounted in the left-hand end of the equalizer bracket or trunnion mounting member 60 between the hanger sections 44 and 54. Similarly, the right-hand end of the member 60 receives the left-hand end of the spring 224', the right-hand end of spring 224' being received within the spring mounting pad 58 mounted between the hanger section 46 and side plate 56. Axle mounting housings 226 and 226' are operatively joined to the central region of each spring, which housings hold the axles by means described more fully hereinafter. The forward and rearward ends of a torque arm 232 connect the lower end of the hanger sections 42, 52 with the axle mounting housing 226. A similar axle mounting housing 226' is received on the central portion of the right-hand spring 224' and a similar torque arm 232' connects the axle mounting housing to the lower portion of the hanger sections 44 and 54.

Figure 5:
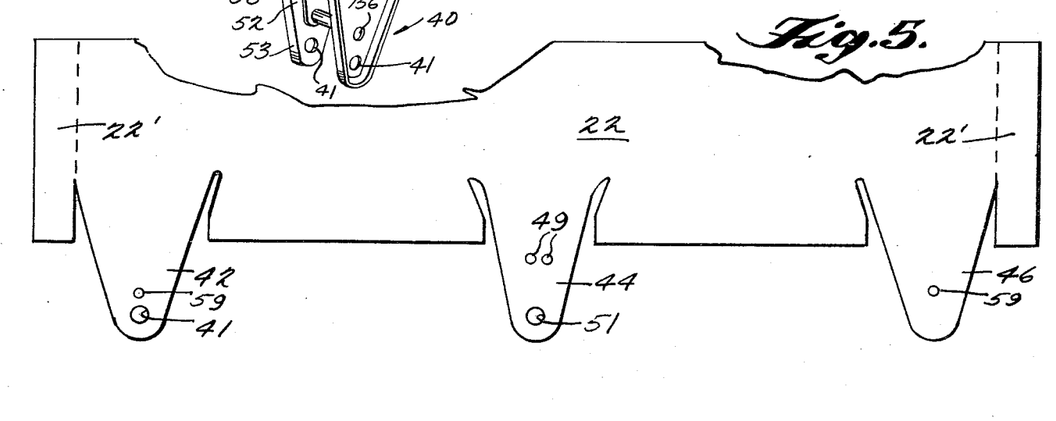
FIGURE 5 is a side elevation view of a blanked side rail for the suspension unit of FIGURE 1, and represents the first stage of production prior to any forming operations.

Turning now to FIGURE 5, there is shown a blanked side rail prior to any forming steps. The blanked side rail is generally defined as a relatively flat rectangular plate having three approximately V-shaped or rounded triangular shaped hanger sections 42, 44 and 46 depending therefrom, as already described. If desired, the side rails 22 may be formed without the end sections 22' indicated by dotted lines. In such case, the side rails would terminate at the ends of the hanger sections. These end sections have, however, been retained throughout the several views for purposes of clarity, it being understood that all fabrication procedures and essential elements of the invention apply whether or not these end sections are included. Each of the hanger sections 42, 44 and 46 is defined in part by cutouts that extend into the body of the flat blanked plate. The cutouts permit formation of lining flanges on the hanger sections as well as the lower channel section 26 in a manner described hereinafter. The overall top to bottom depth of the rectangular portion of the blanked side rail permits formation of both the upper channel section 24 and the lower channel section 26.

Figure 6:
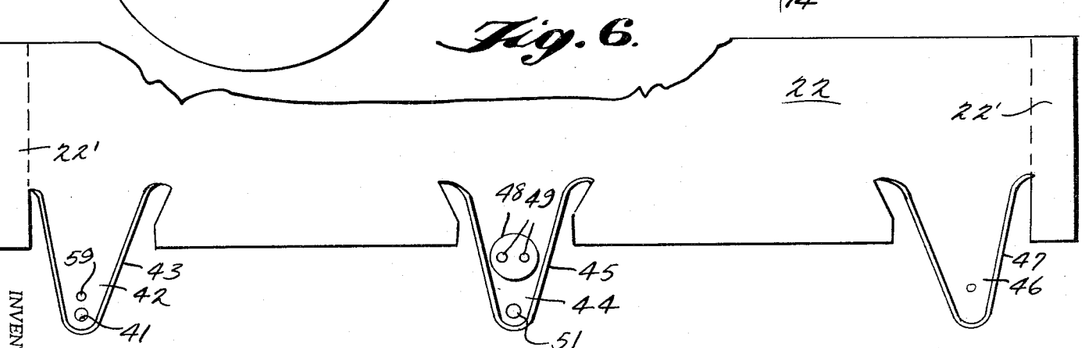
FIGURE 6 is a side elevation of the blanked side rail of FIGURE 5 following the forming operation to turn the bottom lining flange of the three hanger sections with the aid of a suitable forming die, and thereby represents the second stage of production.

In FIGURE 6 the side rail 22 is shown following formation of the lining flanges 43, 45 and 47. In the forming operation, suitable dies act on each of the hanger sections 42, 44 and 46 to provide the outwardly turned lining flanges. These lining flanges provide great rigidity to the otherwise substantially flat metal area of the hanger sections. According to the invention, this feature aids in the provision of a greatly simplified but rigid construction having minimum number of parts. Also formed during the forming operation is the circular detent 48 in hanger section 44. This detent is provided to facilitate the assembling of the trunnion or equalizer member 60 shown in FIGURES 1 and 4. Due to formation of the lining flanges, it is seen that the overall width of each hanger section 42, 44 and 46 is reduced somewhat with respect to the adjacent channel forming sections.

Figure 7:
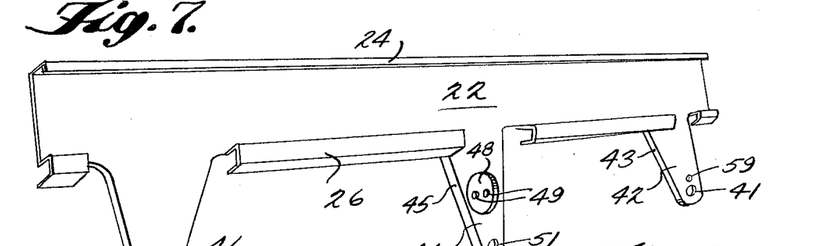
FIGURE 7 is a perspective view taken from the inside of the blanked and formed side rail of FIGURE 6, following a braking operation to provide upper and lower channel areas thereon, and thereby represents the third and final stage of production thereof.
Figure 8:
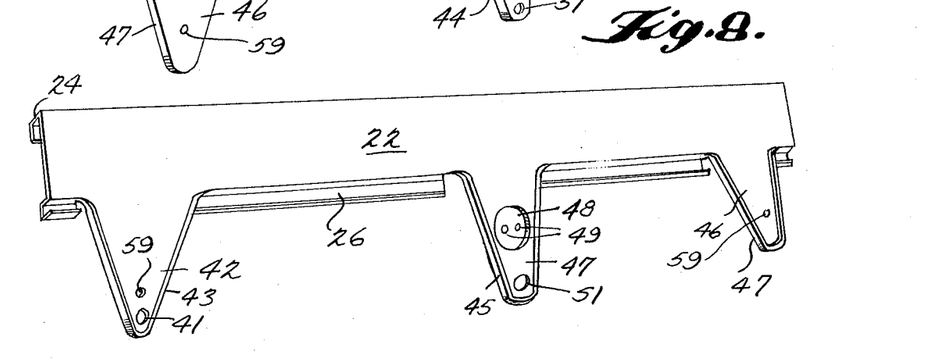
FIGURE 8 is an outside perspective view of the blanked, formed, and broken side rail of FIGURE 7 to show details of the lower channel members and formed hanger sections.

The blanked and formed side rails are next shown in FIGURES 7 and 8 following the braking operation to provide the upper and lower channel sections 24 and 26. The lower channel sections 26 are defined by an inwardly extending horizontal surface, a downwardly extending vertical surface and an outwardly extending horizontal surface as already described hereinbefore. The upper channel members are defined by an inwardly extending horizontal surface and a downwardly extending vertical surface providing a substantially L-shaped channel section. As will be understood in the art, the channel members 24 and 26 provide great flexural rigidity to the side rails which otherwise essentially comprise flat rectangular plates. Also, the channel members 24 and 26 provide attachment surfaces for the reinforcing flanges 28 and 36 as well as surfaces for the attachment of the hanger side plates described hereinafter.

The hanger side plates 52, 54 and 56 are variously illustrated in FIGURES 1 to 4, 13 and 19. Each hanger side plate 52, 54 and 56 comprises a relatively planar area that is provided with a lining flange 53, 55 and 57 around the bottom and side edges thereof. Preferably, the lining flange is turned inward with respect to the sub-frame, and is otherwise quite similar to the lining flanges 43, 45 and 47 on the hanger sections. However, each lining flange 53, 55 and 57 curves outward from each upper side edge of the respective hanger side plate and terminates in a rounded bottom lining flange at the base of the elongated channel sections 62, 64 and 66 at the top of each hanger side plate. These channels 62, 64 and 66 are turned outward with respect to the sub-frame, and are somewhat elongated with respect to the hanger side plate. After assembly of the sub-frame, the channels 62, 64 and 66 form an integral and continuous channel with the lower channel 26 on the side rail 22.

Figure 9:
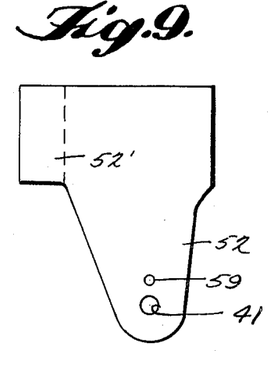
Figure 10:
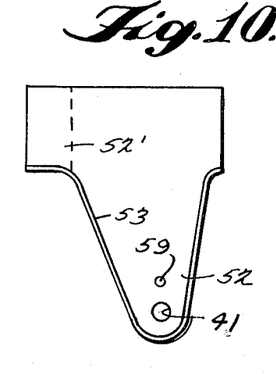
FIGURE 10 is a side elevation view similar to FIGURE 9 of the same hanger side plate following the forming operation to turn the bottom lining flange, and thereby represents the second stage of production thereof.
Figure 11:
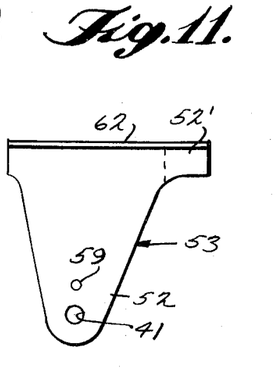
FIGURE 11 is an elevation view of the blanked and formed side plate of FIGURE 10 but taken from the opposite side thereof and following the braking operation to provide the upper "channel" thereon, and thereby represents the third and final production stage of a typical hanger side plate according to the invention.

FIGURES 9 to 11 show three steps in the formation of a typical hanger side plate 52, it being understood that the same formation steps will obtain for the production of the remaining hanger side plates 54 and 56, all of which are mounted inside of the side rails and parallel to the corresponding hanger sections 42, 44 and 46 integrally provided on the side rails. In FIGURE 9, the blanked hanger side plate 52 is shown prior to any forming operations. The blanked side plate is essentially defined by a square or rectangular upper plate area and a depending rounded hanger portion resembling the letter V or a somewhat rounded triangle. Suitable holes 41 and 59 are provided for cooperation with the spring mounting pad 58 and for receiving the left-hand end of a torque arm. The dotted line area 52' corresponds with the extension 22' when this is desired.

In FIGURE 10, the hanger side plate 52 is shown following the operation for forming the lining flange 53, looking at the hanger side plate as it would appear when completed and mounted in the suspension unit to show the lining flange in end view. As with the hanger sections 42, 44 and 46, the lining flange on the hanger side plates 52, 54 and 56 provide strength and reinforcement for purposes of rigidity. In FIGURE 11, the hanger side plate 52 is viewed from the outside as it would appear in the completed suspension unit on the side facing the spring mounting pad 58, following braking to form the channel section 62. Thus, the lining flange is not visible but faces away from the viewer, while the channel member 62 is seen in end view and appears as a set of double lines following the braking operation.

Figure 12:
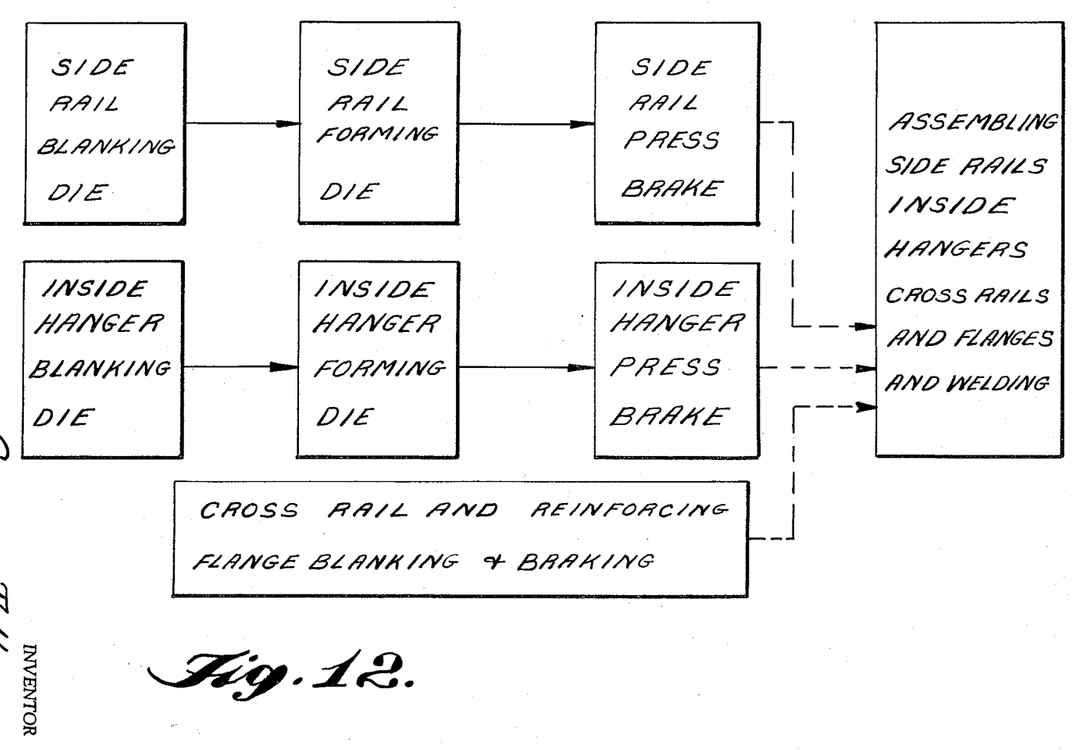
FIGURE 12 is a schematic diagram showing the sequence of forming operations used in producing the suspension unit according to the invention including the steps of forming the side rails, inside hanger plates, cross rails and reinforcing flanges.

The entire sequence of operations can be visualized by reference to the schematic flow diagram in FIGURE 12. The side rail forming steps appear in the top of the figure starting with the step of blanking out the side rail to provide the flat blanked out side rail shown in FIGURE 5. The blanked side rail is then formed to provide the lining flanges as shown in FIGURE 6. Thereafter, the blanked and formed side rail is subjected to the braking operation to provide the completed side rail sections shown in FIGURES 7 and 8 with the upper and lower channels 24 and 26.

Independent of the side rail forming operations but simultaneous therewith as in a continuous production scheme, the hanger side plate 52, 54 and 56 represented by the blanked side plate 52 shown in FIGURE 9 are provided by the blanking operation. Thereafter, the hanger side plates are formed to provide the lining flanges as shown in FIGURE 10. Then, the channel member 62 (FIGURE 11) is formed in a suitable press brake similar to the blanking and braking steps obtained in the formation of the cross rails 30 described in connection with FIGURE 1.

Following the several blanking forming and braking operations, the side rails, hanger side plates, flanges 28 and 36 and cross rails 30 are assembled in suitable jigs. It is preferred however, to use a single precision assembly jig which will accurately align the side rails with the remaining parts. Such a jig can be visualized from FIGURE 1 and need not be described in detail as the shape thereof will vary with design characteristics. Following assembly, all parts are preferably welded or otherwise integrally joined together to provide the "unitized tandem" suspension unit of the invention. As is understood in the art, welding in essence provides a one-piece or single unit construction.

Figure 13:
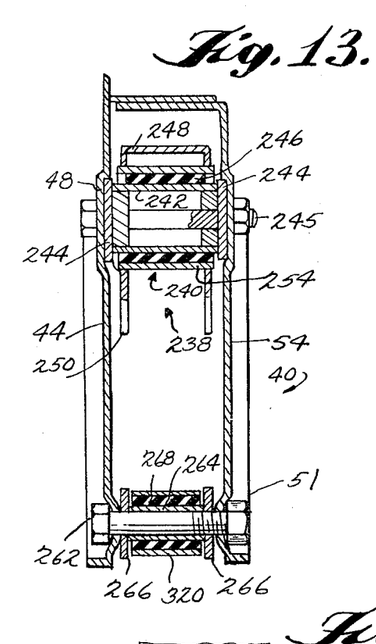
FIGURE 13 is a vertical sectional view, on an enlarged scale, taken substantially along line 13—13 in FIGURE 4 to show details of the central hanger section and spring equalizer bracket.

Referring now to FIGURE 13, it is seen that the central spring hanger 40 includes opposed hanger sections 44 and 54 with a load equalizer bracket 238 mounted between them. The bracket 238 receives the adjacent ends of the leaf spring assemblies 224 and 224', best shown in FIGURES 4 and 14. Fixedly connected between the plates 44 and 54 to receive the bracket 238 is a resiliently mounted equalizer bearing 240 which includes a center sleeve 242 interposed between opposed end plates 244 having apertures therethrough for receiving a bolt 245. A resilient sleeve 246 of rubber or the like is mounted to the exterior surface of the cylindrical sleeve 242. The sleeve 246, in turn, carries the central section 248 of the bracket 238 which includes downwardly converging opposed plates 250 and 252 for receiving the respective ends of the spring assemblies 224 and 224'. The equalizer bracket 238 is secured to a sleeve 254 in snug engagement with the resilient sleeve 246, as best shown in FIGURE 13.

The lower ends of the hanger sections 44 and 54 (FIGURE 13) carry a bolt 262 which in turn receives a sleeve 264 having reinforcing plates 266 joined to the ends thereof. Carried about the sleeve 264 is a resilient sleeve 268 of rubber or the like which normally carries the forward end 320 of the torque arms 232 and 232', as will become apparent.

Figure 14:
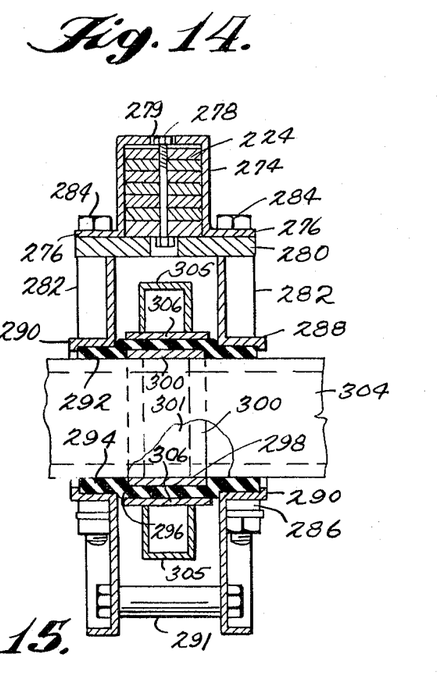
FIGURE 14 is a sectional view, on an enlarged scale, taken substantially along line 14—14 in FIGURE 4 to show details of the torque arm axle mounting housing.

Referring now to FIGURE 14, the axle housing 226 includes a recessed clamping plate 274 having opposed flange portions 276 extending transversely from the bottom thereof. The corresponding visible structure of the axle housing 226' and related elements are designated in FIGURE 4 by corresponding prime numerals. The leaves of the leaf spring 224 have apertures therethrough for receiving a tie bolt 278 which is nested at its upper end within an aligned aperture 279 in the plate 274.

Mounted below the flanges 276 is an upper housing plate 280; and, opposed housing side plates 282 are in normal engagement therewith by four bolts 284. In this regard, the opposed side plates 282 (FIGURES 15 and 16) have transversely bent end portions 286 which receive the bolts 284 to hold the axle housing 226 in place. The opposed side plates 282 have transverse central portions 288 of cylindrical configuration and terminate in inwardly flanged ends 290. The opposed side plates are joined at their lower ends by a nut and bolt assembly 291. Mounted in engagement with the transverse central portions 288 of the opposed side plates 282 is a resilient bearing sleeve 292 having cylindrical end portions 294 and a rectangular central portion 296. The rectangular central portion 296 has an enlarged rectangular interior surface 298 which receives an axle saddle box 300. The axle saddle box 300 has a rectangular exterior surface and a plate 301 with an aperture 302 therethrough of a size corresponding to the interior dimension of the end portion 294 of the resilient sleeve 292 (FIGURE 14). The resilient sleeve 292 is preferably of two-piece, longitudinally split construction and when assembled, forms a generally unitary structure within the axle housing.

The axle housing 226 carries an axle 304 which is secured as by welding to the saddle box 300 at opposed sides thereof. Conveniently, the saddle box 300 may be of split configuration with the upper and bottom portions thereof welded at the axle prior to assembly of the sleeve 292 thereof, as shown in FIGURES 4 and 17.

As stated, the sleeve 292 has a rectangular central portion 296 which is adapted to engage the rearward end of the torque arm 232. To this end, the torque arm 232 is of generally yoke-shaped configuration having rearwardly extending legs 305. A cooperating plate 306 of a generally rectangular configuration is joined to the interior surface of the rearward end of the torque arm 232, and engages the central portion 296 of the resilient sleeve 292. As shown in FIGURES 17 and 18, the torque arm 232 may be constructed of bent metal plate.

Figure 15:
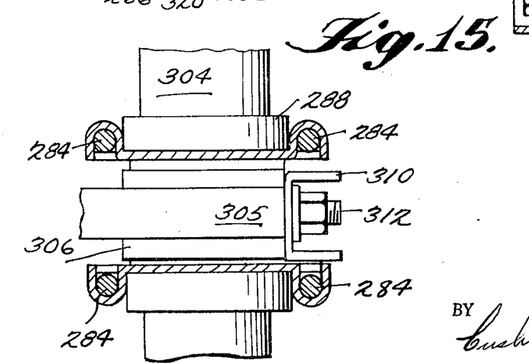
FIGURE 15 is a sectional view on a similar scale, taken along line 15—15 in FIGURE 4 to show other details of the axle mounting housing in relation to the axle.
Figure 16:
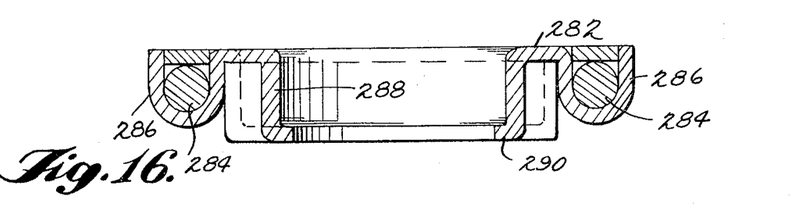
FIGURE 16 is a plan view of an axle mounting housing side plate on still a greater scale.

The yoke end of the torque arm 232 defined by legs 305 is secured to the axle housing 226 by a vertical tie plate 310, as best shown in FIGURE 15. In this regard, the rearward legs 305 of the torque arm 232 have apertures to receive tie bolts 312, as best shown in FIGURES 4 and 15.

Figures 17, 18, 22, 23:
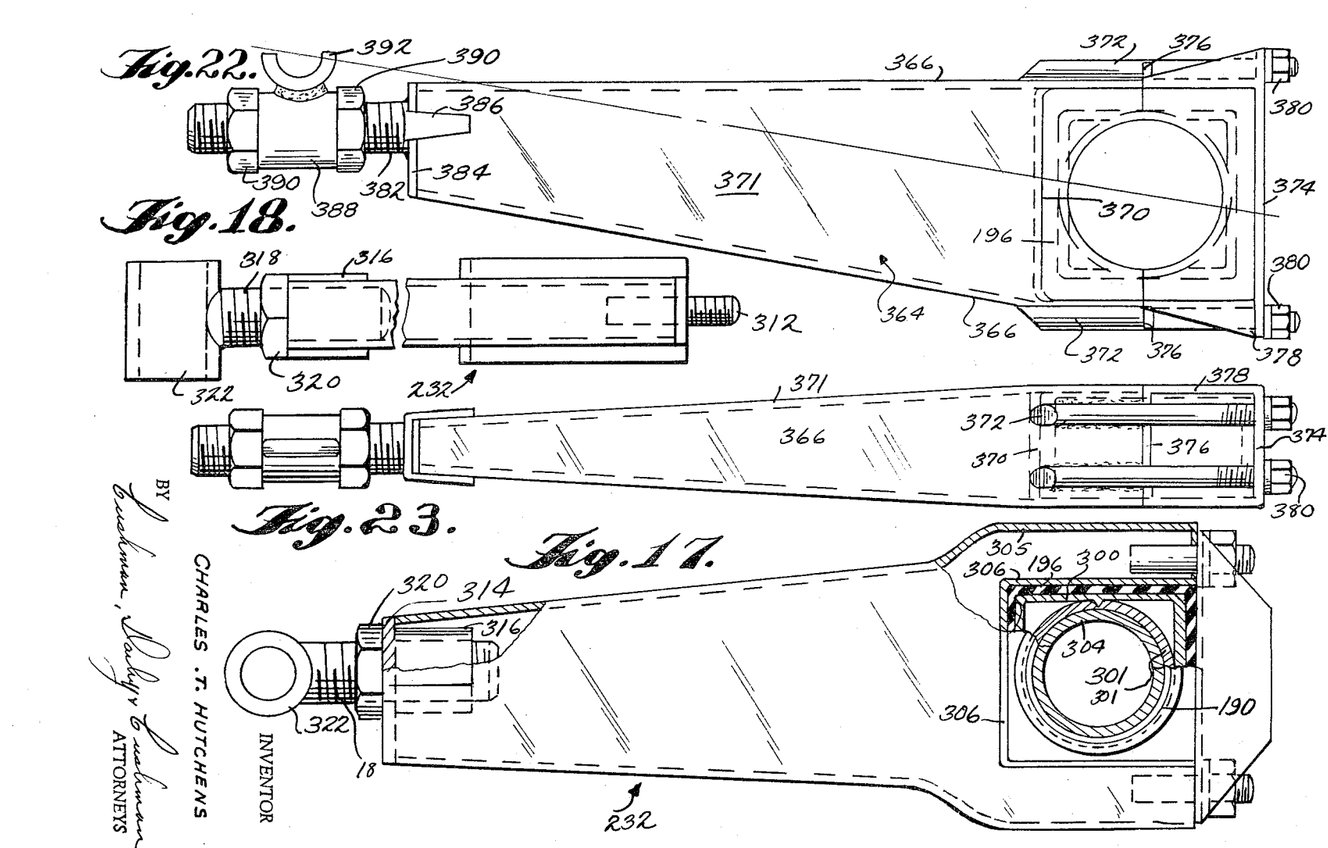
FIGURES 17 and 18 are side elevation and top plan views, respectively, (FIGURE 18 shows left and right ends only), on an enlarged scale, of the rigid torque arm shown in FIGURE 4.
FIGURES 22 and 23 are side elevation and top plan views, respectively, on an enlarged scale, of the rigid torque arm embodiment shown in FIGURE 19 to show other details of construction.

Referring now to FIGURES 17 and 18, the forward end of the torque arm 232 has an aperture 314; and, aligned with this aperture and secured to the interior thereof is a threaded spacer collar 316. Carried and threaded within the spacer collar 316 is a bolt 318 having a nut 320 threaded thereon, and secured to the forward end of the bolt 318 is a bearing collar 322 which is in normal engagement with the resilient sleeve 268 carried by each of the lower ends of the hanger sections 42 and 44 of the side rail 22.

Thus, it is apparent that the torque arm 232 is in planar engagement with the axle housing 226 and is resiliently yieldable with respect thereto by direct engagement with the planar surfaces of resilient sleeve 292. The length of the torque arm 232 is conveniently regulated by loosening the nut 320, turning the bolt 318 to any desired position with respect to the threaded spacer collar 316, and then retightening the jamb nut 320 to secure the new position.

Figures 19, 20, 21:
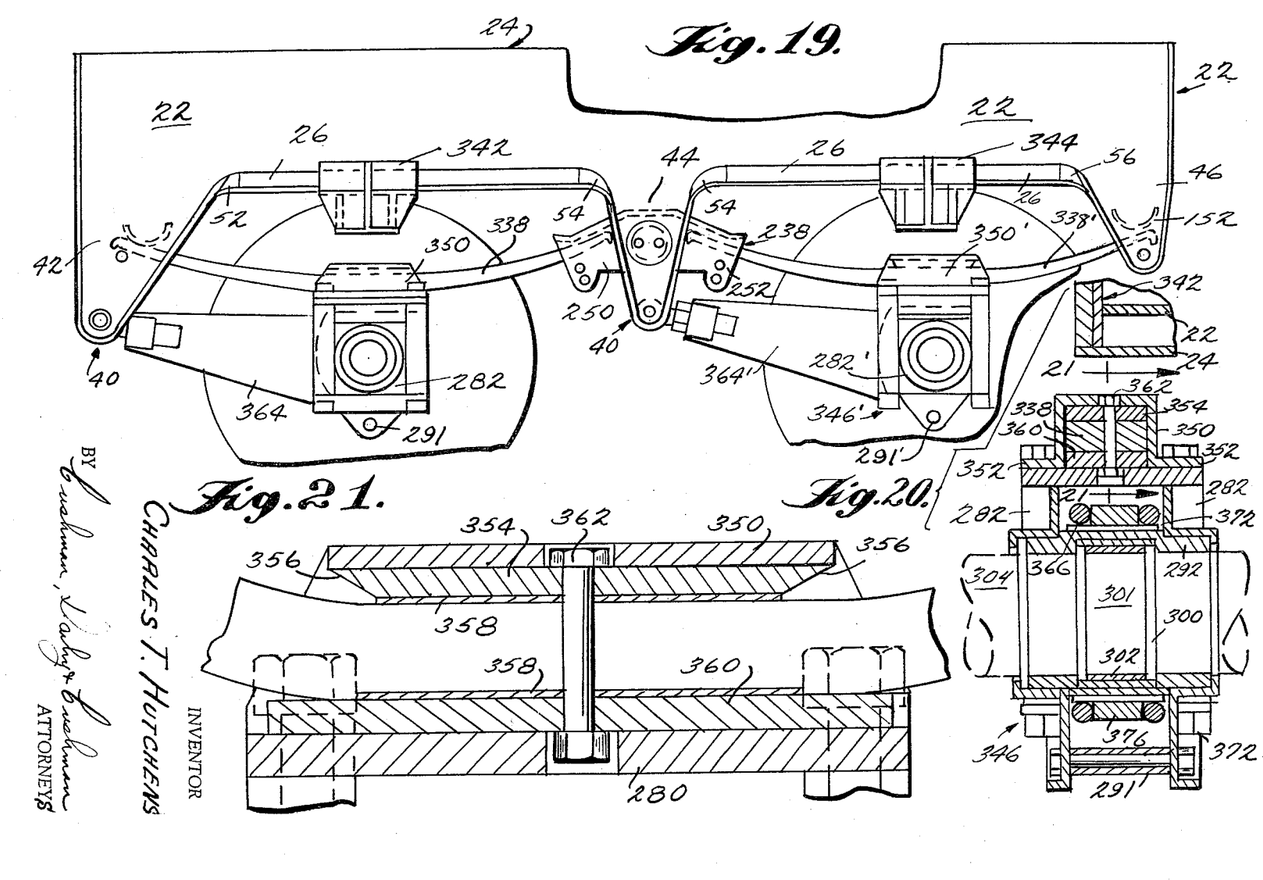
FIGURE 19 is a side elevation, similar to FIGURE 4, but showing a slightly modified suspension unit according to the invention, together with another embodiment of the rigid torque arm according to the invention.
FIGURE 20 is a cross-sectional view, on an enlarged scale, taken along line 20—20 in FIGURE 19 to show details of the rigid torque arm embodiment.
FIGURE 21 is a cross-sectional view, on a still larger scale, taken along line 21—21 in FIGURE 20 to show further details of the rigid torque arm embodiment.

Reference is now made to FIGURE 19 which shows a modified embodiment of the construction shown in FIGURES 1 and 4. The forward, central, and rearward hanger sections 42, 44 and 46, respectively, are similar in shape to the corresponding hanger sections in FIGURE 4. In this embodiment of the invention, single forward and rearward leaf springs 338 and 338' are joined at their respective ends to the various brackets in a manner generally similar to that shown in FIGURE 4. Bumpout stops 342 and 344 are also provided which are joined to the underside of the rail 22 by welding. Preferably, the stops 342 and 344 are positioned along the vertical axis of the trailer wheels.

Joined to the central region of the springs 338 and 338' are axle housings 346, 346', respectively, similar to the axle housings 226, 226' in FIGURE 4, but of slightly modified construction. The axle housings 346, 346' are of substantially identical in construction to each other, and accordingly, the front axle housing 346 will be described in detail, the corresponding visible structure for the rear axle housing 346' being designated by corresponding prime numerals.

As best shown in FIGURE 20, the axle housing 346 includes a spring clamp 350 having transversely extending bottom flanges 352. The spring 338 is received within the clamp 350; and, disposed between the upper surface of the spring 338 and the spring clamp 350 is a fill plate 354 having opposed inclined end surfaces 356 (FIGURE 21).

Strips 358 of Delrin or the like are interposed between the fill plate 354 and the top surface of the spring 340, and adjacent the underside of the spring 340, as best shown in FIGURE 19. A lower fill plate 360 is in abutment with the bottom strip 358, and the assembly is joined together by a tie bolt and nut 362 passing through aligned apertures therein. The head of the bolt 362 is in engagement with the top fill plate 354 and the nut end is in abutment with the lower fill plate 360, as best shown in FIGURE 21. Suitable side plates 282 join the spring 338 to the axle 304 in a manner identical to that shown in FIGURES 4 and 14 with the bottom flanges 352 of the spring clamp 350 abutting the upper housing plate 282.

Referring now to FIGURES 22 and 23, the torque arm 364 in this embodiment of the invention includes top and bottom plates 366 engaging the respective top and bottom surfaces of the rectangular central portions 296 of the bearing sleeve 292. A vertical plate 370 is joined as by welding along its top and bottom edges to the plates 366, and opposed side plates 371 complete the assembly of the torque arm 364. The plates 366 terminate approximately along the axial vertical plane of the axle 304; and, secured to the plates 366 as by welding are spaced-apart tie bolts 372, positioned for engagement with the rearward vertical surface of the central portion 296 of the bearing sleeve 292. In this regard, the tie plate 374 is of generally U-shaped construction, having upstanding flanged ends 376 for abutment with the rear ends of the plates 366. Likewise, the tie plate 374 includes flanged web portions 376 along its rearward end having suitable apertures therethrough for receiving the respective bolts 372. The tie plate 374 is securely joined to the bolts 372 by nuts and washers 380.

The torque arm 364 extends upwardly in the forward direction, there being provided a modified means for joining the forward ends of the torque arm 364 to the respective hanger sections. In this regard, a bolt 382 is joined as by welding to the front plate 384 of the torque arm 364 and reinforced by a slit sleeve 386 welded thereto and to the side walls 371 of the torque arm 364. A sleeve 388 is carried on the bolt 382 and selectively positioned therealong by spaced-apart jamb nuts 390. Joined to the upper surface of the sleeve 388 is a tie ring 392 which engages the hanger sections along their lower ends in a manner identical to that shown in the embodiment of the invention in FIGURE 13. Conveniently, the means for joining the torque arm 364 to the hanger sections may be still further modified, e.g., by joining the bolt 382 to the torque arm 364 by the means shown in FIGURES 17 and 18. The construction of the torque arm 364 in FIGURES 19 and 20 provides a materially reduced weight as compared to the structures shown in FIGURES 17 and 18, and by virtue of providing an upwardly extending torque arm construction, the undesirable stresses are still further reduced. This modified construction shown in FIGURES 19 and 20 likewise encompasses the resilient means according to this invention for joining the rearward end of the torque arm 264 to the axle housings 226, 226'.

From the foregoing description, it will be apparent that the invention provides a suspension unit that can be manufactured, marketed and delivered at considerably less cost than a comparable suspension assembly that is manufactured from a plurality of separate parts. However, other advantages, besides lower cost and ease of maintenance, are also realized with the construction according to the invention that overcome serious manufacturing and operating problems.

Up to this time, dual axle spring hangers along with necessary parts have been purchased by trailer manufacturers as separate and unassembled pieces. The manufacturer was required to construct a suitable frame to which the tandem parts were attached either by welding or bolting. This is obviated by the present construction wherein the spring hangers and the structural framework of the complete unit are formed from one piece of metal into one entire side of the unit. Several advantages are gained through this method of construction, the principal one being that all sections of this assembly are properly located and are identical since the complete forming operation is performed in a single die. Also, generous weld fillets are possible between the hanger sections and the main frame to build up strength in these critical areas. Even so, the present development actually reduces to a minimum the total number of welding steps and welding time. Further, trailer manufacturers receive parts in a nearly assembled condition. The field assembly costs are reduced to the lowest figure. Frame heights are adjusted in the top area of the frame structure above hanger parts, in a manner already explained.

A common difficulty in the industry is in the location of hangers on the sub-frame so that they are in identical locations from one unit to the next. Fabricators have constant trouble in the field with springs coming out of the hangers and in checking, in practically all instances, it is found that the hangers are located in a slightly different position than they should be. By having the hangers all made together with the sub-frame according to the present invention, this difficulty is obviated as the hangers will always be located at the same place every time. This type of construction also eliminates the need for plural jigs and fixtures in a manufacturer's plant for separately locating the hangers accurately.

The common method of attaching hangers to a frame is either by bolting or welding. Difficulty is encountered in that the bolts become loose on the frame allowing the hangers to break. Also, when welding the hangers separately to the frame, experience shows that the result is always a stress concentration that often results in frame or hanger breakage. This disadvantage is completely obviated according to this invention.

It is often necessary to relocate a complete suspension for different state laws, local ordinances and the like. This is difficult with present suspensions that are constructed in separate pieces. By proceding according to the invention, however, having a frame and hangers in a single piece, the entire running gear can be relocated all at one time rather than having to relocate each hanger at a time.

Ordinarily, in having to put the hangers on a conventional frame, one frequently runs into an alignment problem where the hangers or some of them at least, may not be vertical to the ground. This allows for spring wear against the hangers, side plates, etc. This is completely obviated by the present invention. Also, the invention will save time and space in the manufacturing plant because the hangers and frame are in one piece rather than having separate inventories for each and every part.

An important feature that has not been well realized with prior constructions is that of the replacement or slider concept. The present unitized tandem works in very easily with a slider concept, particularly on a body rail of a trailer. The common practice in making a slider is to make a bogie frame, attach the hangers, and then install it under a trailer with a body rail. With the present construction, however, there already is a slider and bogie frame assembled together as a single unit, and it is a very simple matter to make a slider out of it.

As a further advantage, the present suspension unit has removable wear pads. At the present, when a hanger wears the wear pad out, the entire hanger in most instances is removed and a new one installed. This is completely obviated by the present invention.

Another important feature of the present invention is the rigid, yet flexibly mounted torque arms which are designed to absorb the braking forces which tend to resolve the axles. These forces are the source of tandem trailer hopping. This is completely overcome with square saddle boxes which are welded to the sides of the axle beam directly under the torque arm rear axle mounting areas. The four corners of these box members are housed in square interior surfaces in the rubber axle mounting bearings and flexibly resist the rotation of the axles. The torsional forces in these parts, during a heavy braking operation, are very high. By the use of the square saddle boxes, the four corners of the saddle are used to divide these heavy torsional stresses into four equal parts. This arrangement reduces the forces in the rubber bearings to reasonable working loads.

Also, it is known that in order to follow uneven ground, axles must have a great amount of freedom to allow one wheel to lift over a curb or other obstacles and at the same time divide the axle loads between the high and low wheels evenly. To establish this freedom without developing large torsional forces in torque beams, etc., the proportions of the rubber axle mounting bearings are desirably kept small in over-all height and width. However, according to this invention, the four corners of the saddle box make it possible to reduce the proportions of the bushing to the minimum.

Springs that are rigidly clamped to the axles of a tandem of this character tend to transfer an unequal amount of the total axle load either to or from the equalizer as the trailer unit is moved over uneven ground. The result is an unbalanced weight carried by the two axles of the tandem unit. However, in the present assembly, the springs are mounted on the rounded portions of the rubber axle mounting bearings. With this arrangement, the springs are free to rotate about the axle to equalize weights carried on each end of each spring, thereby retaining an equal balance of weight on each of the axles in the assembly. Further, adjustments are faciiltated due to means in the forward ends of these torque arms to line up axles with the king pin of the trailer unit for good tracking and low tire wear and resistance.

In reviewing the foregoing description and accompanying drawings, it will be appreciated that the objects of this invention have been successfully achieved. However, the present invention should not be limited to the precise configurations shown in the drawings, as changes and modifications of the structure of the invention will become apparent to those skilled in the art without departing from the spirit and scope of this invention.

For example, it will be apparent that the construction of this invention is suitable for vehicles having one, two or more rear axles; hence, the claimed recitation of "a suspension assembly" having "a plurality of hanger sections," meaning two or more such hanger sections. Also, other torque arms, including those of the nonadjustable type, can be satisfactorily used with this suspension unit.

Further, it will be appreciated that the several parts, particularly the side rail, need not be blanked, formed and broken in one piece where a fabricator may not yet have a press with a large enough bed to blank out the whole side plate piece in one operation; that is, no press with a large enough bed to hold the necessary dies to blank out the whole piece of metal by one action of the press. Instead, there may be several large presses with one die in one press, another die in another press, and the third die in a third press. A side plate could then be produced by running the sheet of metal first through the first press where one-third is blanked out, then onto the next press where the next third, or center, is blanked out, and then onto the last press where the remaining end third is blanked out. This operation would blank the sheet of metal into the form shown in FIGURE 6, after which the side rails could then be formed into the completed side rails. The hanger side plates could then be blanked out by presses and formed so that they fit and are welded into place on the respective side rails. Bracing and the cross members could then be welded into place to provide a one-component suspension assembly.

Accordingly, the description of the embodiments of the invention herein should be interpreted in an illustrative rather than a limiting sense, and the scope of the invention should not be limited, except as defined in the appended claims.

What is claimed is:

1. A suspension tandem assembly for trailer vehicles and the like comprising: frame means adapted to be carried by the vehicle; forward and rearward leaf spring assemblies operatively carried by said frame means; axle housing means joined to the central region of each of said leaf spring assemblies for receiving vehicle axles; planar bearing surfaces mounted within said axle housing means; resilient means operatively carried by said axle housing means; torque arms joined at their forward ends to said frame means and having cooperating planar surfaces at the rearward ends thereof, said torque arm cooperating planar surfaces being in engagement with said resilient means which in turn are in engagement with the respective planar bearing surfaces of said axle housing means to provide a yieldable transfer of stress between vehicles axles carried by said axle housing means and said torque arms.

2. The suspension tandem assembly defined in claim 1 including means for regulating the length of said torque arms.

3. The suspension tandem assembly defined in claim 1 wherein the rearward end of said torque arm includes a yoke-shaped portion in engagement with said axle housing resilient means along the interior surfaces thereof.

4. The suspension tandem assembly defined in claim 1 wherein said resilient means includes a sleeve mounted within said housing, said sleeve having a central portion; an axle saddle box mounted within said central portion, said torque arm being in engagement with the exterior surfaces of the central portion of said sleeve.

5. The suspension tandem assembly defined in claim 4 wherein said central portion is of generally rectangular configuration.

6. A suspension tandem assembly for trailer vehicles and the like comprising: frame means adapted to be carried by the vehicle; forward and rearward leaf spring assemblies operatively carried by said frame means; axle housing means joined to the central region of each of said leaf spring assemblies for receiving vehicle axles; planar bearing surfaces mounted within said axle housing means; resilient means operatively carried by said axle housing means; torque arms joined at their forward ends to said frame means and having cooperating planar surfaces at the rearward ends thereof, said torque arm cooperating planar surfaces being in engagement with said resilient means which in turn are in engagement with the respective planar bearing surfaces of said axle housing means to provide a yieldable transfer of stress between vehicle axles carried by said axle housing means and said torque arms; said resilient means including a sleeve mounted within said axle housing means, said sleeve having a central portion; an axle saddle box mounted within said central portion, said saddle box having a generally rectangular exterior surface and a circulr hole therethrough for receiving an axle; said torque arm being in engagement with the exterior surfaces of the central portion of said sleeve.

7. The suspension tandem assembly defined in claim 6 which is a unitary, transportable structure.

8. The suspension tandem assembly defined in claim 6 including a vehicle axle, said saddle box being welded to said vehicle axle at opposed sides thereof only.

9. The suspension tandem assembly defined in claim 8 wherein the said means for regulating the length of said torque arms includes a bolt joined to the forward end of said torque arm, a collar carried on said bolt means for engagement with said frame, and a jamb nut means carried on said bolt for fixing the longitudinal position of said bolt in said collar.

10. A suspension tandem assembly for trailer vehicles and the like comprising: frame means adapted to be carried by the vehicle; front and rear leaf spring assemblies operatively joined to said frame means at their respective forward and rearward ends, front and rear axle housing means joined to the respective spring assemblies for receiving vehicle axles, torque arms joined at their forward ends to said frame means and at their rearward ends to said respective axle housing means, said axle housing means including a resilient bearing sleeve having circular end portions and a multiplanar central portion, an axle saddle box mounted within the multiplanar central portion of said resilient bearing sleeve; opposed side plates carrying the circular end portions of said sleeve for transmitting weight between an axle of said vehicle and its respective spring assembly; said torque arms including cooperating multiplanar surfaces in engagement with the central portion of said resilient bearing sleeve.

11. The suspension tandem assembly defined in claim 10 wherein the central portion of said sleeve is of generally rectangular configuration.

12. The suspension tandem assembly defined in claim 10 wherein said torque arm includes rearwardly extending bolt means and plate means joined thereto, said plate means being in abutment with the central portion of said resilient bearing sleeve.

13. The suspension tandem assembly defined in claim 10 wherein said sleeve is of longitudinally split two-piece construction.

14. The suspension tandem assembly defined in claim 10 including means for adjusting the length of said torque arms.

15. The suspension tandem assembly defined in claim 14 wherein said means includes a bolt extending from the forward end of said torque arm, frame engaging means carried by said bolt; and at least one jamb nut for fixing the position thereof with respect to said bolt.

16. The suspension tandem assembly defined in claim 14 wherein said torque arms extend upwardly from said axle housing means to said frame means.

17. The suspension tandem assembly of claim 7 wherein said frame means includes an upper frame portion and integral therewith, downwardly extending hanger sections and spring hangers.

18. A rigid suspension assembly adapted to be attached as a single unit to a vehicle body, said assembly comprising
   a pair of laterally spaced parallel side frame structures, each of said side frame structures including
      a horizontally extending elongated side rail member constructed of a single piece of flat stock and disposed with a flat face thereof disposed generally vertically,
   a plurality of longitudinally spaced first hanger sections constructed integrally of the same single piece of flat stock as said side rail member and disposed in depending relation with respect thereto,
      each of said first hanger sections having laterally extending peripheral flange means constructed integrally of the same single piece of flat stock as said side rail member for rigidifying the associated first hanger section,
   a second hanger section disposed in laterally spaced relation with respect to each of said first hanger sections and constructed of a separate piece of flat stock mounted in rigidly fixed relation with respect to said side rail member so as to cooperate with the associated first hanger section to receive a portion of a resilient axle means mounting structure therebetween,
      each of said second hanger sections having laterally extending peripheral flange means constructed integrally of the same flat stock as the associated second hanger section for rigidifying the associated second hanger section,
   an upper horizontally extending flange rigid with and extending laterally from the upper edge of said side rail member substantially through its length, and
   a lower horizontally extending flange rigid with and extending laterally from said side rail member substantially through its length at a level defined by the lower edge means thereof extending between said first hanger section for rigidly maintaining each of said cooperating first and second hanger sections in rigidly spaced relation at the upper portions thereof, and
   a plurality of longitudinally spaced transversely extending cross frame members rigidly secured to each of said side frame structures and maintaing said side frame structures in rigid fixedly spaced relation with the respective cooperating first and second hanger sections of each in longitudinal alignment.

19. An assembly as defined in claim 18 wherein each of said side frame structures is symmetrical about a transverse medial vertical plane.

20. An assembly as defined in claim 18 wherein the lower flanges of said side frame structures include
   first flange portions extending laterally from the lower edges of said side rail members between the first hanger sections thereof constructed of the same single piece of flat stock as the associated side rail member, and
   second flange portions extending laterally from the upper edges of said second hanger sections constructed of the same separate flat stock as the associated second hanger section,
      the first and second flange portions of each said side frame structure being rigidly secured together to form the continuous lower flange thereof.

21. An assembly as defined in claim 20 wherein the upper flange of each side frame structure includes a longitudinally continuous flange portion extending laterally from the upper edge of the associated side rail member and constructed of the same single piece of flat stock as the associated side rail member.

22. An assembly as defined in claim 18 wherein said plurality of first hanger sections includes an end hanger section adjacent each end of the associated side rail member and a central hanger section spaced between the end hanger sections of the associated side rail member, an equalizer member pivotally mounted intermediate its ends between each central hanger section and the associated second hanger section and having a first spring seat connected with each end thereof, each of said first spring seats being associated with a second spring seat connected between the adjacent end hanger section and its associated second hanger section.

23. An assembly as defined in claim 22 including a leaf spring connected between each pair of associated first and second spring seats, a wheeled axle connected to the central portions of each pair of parallel leaf springs and a torque arm associated with each leaf spring connected between the associated axle and between a cooperating pair of first and second hanger sections associated with the respective leaf spring.

References Cited by the Examiner

UNITED STATES PATENTS

| | | | |
|---|---|---|---|
| 2,204,087 | 6/1940 | Konetsky | 280—104.5 |
| 2,244,847 | 6/1941 | Oeckl | 29—155 |
| 2,907,579 | 10/1959 | Masser | 280—104.5 X |
| 3,004,324 | 10/1961 | Macomber | 29—155 |
| 3,022,087 | 2/1962 | Black | 280—104.5 |
| 3,074,738 | 1/1963 | Ward | 280—104.5 |

FOREIGN PATENTS 435,058   5/1948   Italy.

BENJAMIN HERSCH, *Primary Examiner.*

P. GOODMAN, *Assistant Examiner.*